(12) United States Patent
Martin et al.

(10) Patent No.: US 9,330,051 B1
(45) Date of Patent: May 3, 2016

(54) COLLECTION OF WEB SERVER PERFORMANCE METRICS TO A CENTRALIZED DATABASE FOR REPORTING AND ANALYSIS

(75) Inventors: Justin Alan Martin, Olathe, KS (US); Brian John Washburn, Kansas City, MO (US); Shaun Michael Johnson, Kansas City, MO (US); Brian Elwood Hayward, Lawrence, KS (US); Devin Kelley, Independence, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1178 days.

(21) Appl. No.: 11/945,398

(22) Filed: Nov. 27, 2007

(51) Int. Cl.
*G06F 15/173* (2006.01)

(52) U.S. Cl.
CPC .................................... *G06F 15/173* (2013.01)

(58) Field of Classification Search
CPC ........................................................ G06F 15/173
USPC .......................................................... 709/224
See application file for complete search history.

(56) References Cited

U.S. PATENT DOCUMENTS

| | | | |
|---|---|---|---|
| 6,182,136 B1* | 1/2001 | Ramanathan et al. | 709/224 |
| 6,279,001 B1* | 8/2001 | DeBettencourt | G06F 11/0709 |
| 6,304,904 B1* | 10/2001 | Sathyanarayan | H04L 12/2602 709/224 |
| 6,317,786 B1* | 11/2001 | Yamane | G06F 9/505 709/224 |
| 6,330,561 B1* | 12/2001 | Cohen et al. | 707/754 |
| 6,523,027 B1* | 2/2003 | Underwood | |
| 6,691,159 B1* | 2/2004 | Grewal | G06Q 30/02 709/203 |
| 6,714,975 B1* | 3/2004 | Aggarwal et al. | 709/224 |
| 6,950,868 B1* | 9/2005 | Faraldo, II | H04L 12/2602 709/224 |
| 7,461,369 B2* | 12/2008 | Zhao et al. | 717/131 |
| 7,647,323 B2* | 1/2010 | Kasriel et al. | 709/224 |
| 7,685,273 B1* | 3/2010 | Anastas et al. | 709/224 |
| 7,873,715 B1* | 1/2011 | Haber | G06F 17/30899 709/224 |
| 8,065,410 B1* | 11/2011 | Breen | H04L 67/025 709/224 |
| 8,606,900 B1* | 12/2013 | Levergood et al. | 709/224 |
| 9,043,428 B2* | 5/2015 | Lobo et al. | 709/213 |
| 2002/0059193 A1* | 5/2002 | Decime | 707/3 |
| 2002/0087679 A1* | 7/2002 | Pulley | G06Q 30/02 709/224 |
| 2002/0099816 A1* | 7/2002 | Quarterman et al. | 709/224 |
| 2002/0099818 A1* | 7/2002 | Russell | H04L 67/02 709/224 |
| 2002/0178169 A1* | 11/2002 | Nair et al. | 707/100 |
| 2002/0198939 A1* | 12/2002 | Lee et al. | 709/203 |
| 2003/0046383 A1* | 3/2003 | Lee | H04L 41/046 709/224 |
| 2003/0130982 A1* | 7/2003 | Kasriel | G06F 17/3089 |
| 2003/0131106 A1* | 7/2003 | Kasriel | G06F 17/30899 709/225 |

(Continued)

OTHER PUBLICATIONS

Merriam-Webster, "computer", 2014.*

(Continued)

*Primary Examiner* — O. C. Vostal (57) ABSTRACT

Systems, methods, and computer-readable media are provided for, among other things, generating web server performance metrics from log file information and storing the metrics offline in a centralized database. A collector accesses log file information from a log file for a web server and generates web server performance metrics on a per web page basis. The web server metrics include a number of requests for a web page, error count for the web page, average response time for the web page, total number of bytes transferred for the web page, and a number of times a service level objection for the web page was exceeded. The web server metrics are stored in a centralized database such that the metrics are available for offline web server performance reporting and analysis.

18 Claims, 3 Drawing Sheets

(56) References Cited

U.S. PATENT DOCUMENTS

| | | | |
|---|---|---|---|
| 2003/0191837 A1* | 10/2003 | Chen | H04L 41/142 709/224 |
| 2003/0217144 A1* | 11/2003 | Fu | H04L 29/06 709/224 |
| 2003/0217162 A1* | 11/2003 | Fu | H04L 29/06 709/229 |
| 2003/0221000 A1* | 11/2003 | Cherkasova et al. | 709/224 |
| 2004/0107296 A1* | 6/2004 | Donker et al. | 709/245 |
| 2004/0193480 A1* | 9/2004 | Pinsonnault | G06Q 10/10 705/44 |
| 2005/0108327 A1* | 5/2005 | Hama | 709/203 |
| 2006/0036400 A1* | 2/2006 | Kasriel et al. | 702/182 |
| 2006/0064483 A1* | 3/2006 | Patel | 709/224 |
| 2006/0069768 A1* | 3/2006 | Wen | H04L 63/1408 709/224 |
| 2006/0253850 A1* | 11/2006 | Bruno et al. | 717/173 |
| 2007/0156698 A1* | 7/2007 | Gebhart et al. | 707/10 |
| 2007/0174426 A1* | 7/2007 | Swildens et al. | 709/217 |
| 2007/0219860 A1* | 9/2007 | Karls | G06Q 30/02 705/14.55 |
| 2007/0271375 A1* | 11/2007 | Hwang | G06F 11/3419 709/224 |
| 2008/0114875 A1* | 5/2008 | Anastas et al. | 709/224 |
| 2008/0191816 A1* | 8/2008 | Balachandran et al. | 333/24 R |
| 2008/0214204 A1* | 9/2008 | Ramer et al. | 455/456.1 |
| 2008/0222283 A1* | 9/2008 | Ertugrul | G06Q 30/02 709/224 |
| 2009/0204573 A1* | 8/2009 | Neuneier | G06F 11/3438 |

OTHER PUBLICATIONS

Microsoft Computer Dictionary, "absolute link", p. 12, 2002.*
Microsoft Computer Dictionary, "directory path", p. 162, 2002.*
Microsoft Computer Dictionary, "hyperlink", p. 260, 2002.*
Microsoft Computer Dictionary, "link", p. 312, 2002.*
Microsoft Computer Dictionary, "path", p. 394, 2002.*

* cited by examiner

COLLECTION OF WEB SERVER PERFORMANCE METRICS TO A CENTRALIZED DATABASE FOR REPORTING AND ANALYSIS

BACKGROUND

Web servers generally maintain a variety of web pages or documents and make the web pages available to client devices upon receiving web page requests from the client devices. Companies, governments, and other entities often rely on the availability of web servers for a variety of purposes, such as servicing clients and connecting employees. As such, it is desirable to monitor web servers for capacity planning and problem-identifying purposes and to maximize web server performance.

In some cases, web traffic simulators have been used to analyze the performance of web servers. These web traffic simulators provide synthetic user transactions in an attempt to simulate what users would do when they visit a web site. However, web traffic simulators present a number of drawbacks. For instance, web traffic simulators fail to provide real-world data including information such as the volume of actual transactions. Additionally, web traffic simulators are limited in the types of transactions they can perform and may not be able to perform transactions that a real user could perform. Further, the web traffic generated by the web traffic simulators typically is not realistic as it does not truly mimic how a real user would interact with a web site. Accordingly, the usefulness of information provided by such web traffic simulators is limited.

SUMMARY

The present invention is defined by the claims below. This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention provide systems, methods, and computer-readable media for, among other things, accessing log file information from a web server, generating web server performance metrics based on the log file information, and storing the web server performance metrics in a centralized database. Embodiments of the present invention have several practical applications in the technical arts including, but not limited to, making web server performance metrics for a web server available in a centralized database separate from the web server, facilitating offline web server performance reporting and analysis.

Accordingly, in one aspect, an embodiment of the invention is directed to one or more computer-storage media embodying computer-useable instructions for performing a method that includes accessing, on a device separate from a web server, log file information from a log file for the web server, the log file information including entries for web server transactions during an interval period for a number of web pages maintained by the web server. The method also includes parsing the log file information and grouping the parsed log file information by web page. The method further includes calculating web server performance metrics on a per web page basis for the interval period based on the parsed log file information. The web server performance metrics include for at least a portion of the web pages: a number of web page requests, error counts, average response time, total number of bytes, and a number of times a service level objective was not met. The method still further includes storing the web server performance metrics in a database.

In another aspect of the invention, an exemplary embodiment is directed to one or more computer-storage media embodying computer-useable components for generating web server performance metrics for facilitating web server performance analysis. The computer-useable components a log file access component that accesses log file information from a log file for a web server at a predetermined sampling rate. The log file includes a number of entries for web server transactions for a number of web pages maintained by the web server, wherein the web server transactions include web page requests and responses. The computer-useable components also include a parser that parses the log file information. The computer-useable components further include a total accumulator for calculating web server performance metrics on a per web page basis based on the parsed log file information. The total accumulator calculates the web server performance metrics for interval periods corresponding with the predetermined sampling rate. The web server performance metrics include a total number of web page requests for each web page, an error count for each web page, an average response time for each web page, a total number bytes transferred for each web page, and a number of times a service level objective was exceeded for each web page. The web server performance metrics from the total accumulator are stored in a database external to the web server.

A further aspect of the invention takes the form of one or more computer-storage media having stored thereon a data structure for storing web server performance metrics for facilitating web server performance analysis. The data structure includes a first data field containing data representing a web page identifier for a web page; a second data field containing data representing a total number requests for the web page during an interval period; a third data field containing data representing an error count for the web page during an interval period; a fourth data field containing data representing an average response time for the web page during the interval period; a fifth data field containing data representing a total number of bytes transferred for the web page during the interval period; and a sixth data field containing data representing a number of times a service level objective for the web page was exceeded during the time interval.

BRIEF DESCRIPTION OF THE SEVERAL VIEWS OF THE DRAWINGS

The present invention is described in detail below with reference to the attached drawing figures, which are incorporated by reference herein and wherein.

DETAILED DESCRIPTION

As previously mentioned embodiments of the present invention permit, among other things, web server performance metrics to be generated from log file information and stored offline in a centralized database. More particularly, embodiments of the present invention provide systems, methods, and computer-readable media for, among other things, accessing log file information from a web server, generating web server performance metrics based on the log file information, and storing the web server performance metrics in a database. The web server performance metrics are generated on a per web page basis and include a number of requests for a web page, error count for the web page, average response time for the web page, total number of bytes transferred for the web page, and a number of times a service level objection for the web page was exceeded. Storing the web service performance metrics in a centralized database allows the metrics to be available for offline web server performance reporting and analysis.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

API Application Programming Interface
HTTP Hypertext Transfer Protocol
IP Internet Protocol
SLO Service Level Objective As one skilled in the art will appreciate, the present invention may be embodied as, among other things: a method, system, or computer-program product. Accordingly, the present invention may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and non-volatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
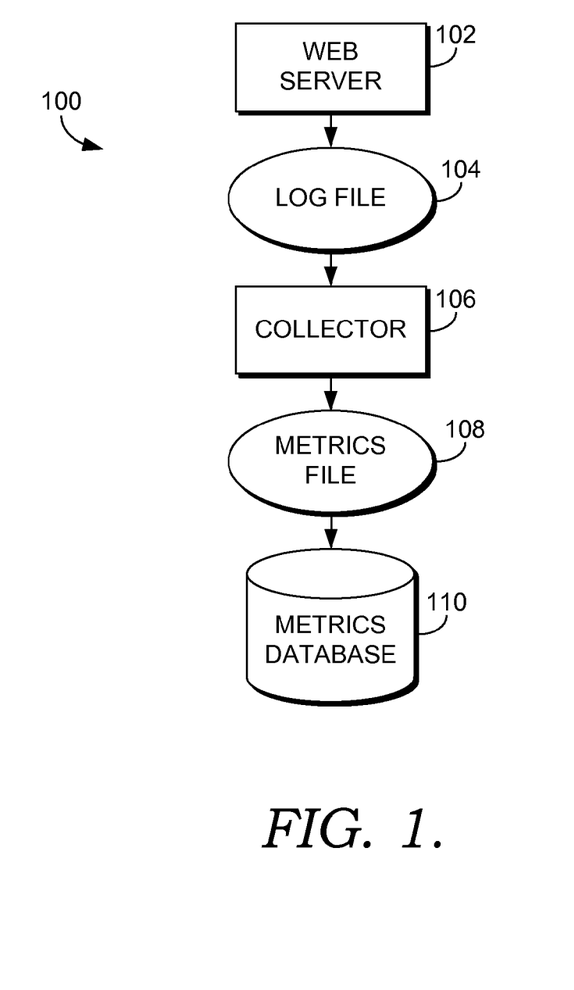
FIG. 1 is a block diagram of an exemplary system architecture suitable for use in implementing an embodiment of the present invention.

Referring to FIG. 1, a block diagram is shown of an exemplary system 100 in which exemplary embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

FIG. 1 depicts the collection of web server metrics for a web server 102 in accordance with an embodiment of the present invention. Generally, web servers, such as the web server 102, host a variety of web pages for one or more web sites and may respond to HTTP requests for web pages from client devices (not shown) by providing an HTTP response that includes a requested document. Typically, web servers have the ability of logging information regarding the operation of the web servers, such as client requests and web server responses, to log files, such as the log file 104.

In an embodiment of the present invention, the web server 102 is configured to provide log files in a format that is easily parseable and includes information used in generating a metrics file 108 as will be described in further detail below. By way of example only and not limitation, log file formats that may be employed within various embodiments of the invention include IIS W3C Extended log file format, SunOne/Iplanet, Apache/IHS 2.0.X, and Apache/IHS 1.3.X. Typically, the default log file format is not employed. Instead, the settings for the file format are adjusted to provide the parseable format and information necessary to generate the metrics file 108 in accordance with embodiments of the invention. By way of example only and not limitation, in embodiments, log file formats may be specified as follows:

SunOne/Iplanet—Enable statistics
Format for logging: %Ses->client.ip%|%Req->vars.auth-user%|[%SYSDATE%]|%Req->reqpb.uri%|%Req->reqpb.query%|%Req->srvhdrs.clf-status%|%Req->srvhdrs.content-length%|%duration%|%Req->reqpb.protocol%|%Req->reqpb.method%|

Apache/IHS 2.0.X
LogFormat "% a|%l|%t|%U|%q|%>s|%b|%D|%H|%m|" common

Apache/IHS 1.3.X
LogFormat "%a|%l|%t|%U|%q|%>s|%b|%T|%H|%m|" common

IIS W3C Extended log format
Fields: date time s-sitename s-ip cs-method cs-uri-stem cs-uri-query s-port cs-username c-ip cs(User-Agent) cs-host sc-status sc-substatus sc-win32-stat us sc-bytes cs-bytes time-taken A collector 106 is provided for accessing information from the log file 104 and generating a metrics file 108. Although FIG. 1 illustrates a single collector 106 accessing a log file 104 from a single web server 102, it should be understood that in embodiments, one or more collectors may access log files from one or more web servers XXX. In some embodiments, the collector 106 may reside on a computing device separate from the web server 102. As such, the operation of the collector 102 and collection of web server metrics in accordance with embodiments of the present invention reduces or eliminates any impact on applications running on the web server 102. Additionally, any updates to the collector 106 require no downtime for the web server 102. Further, no additional code needs to be added to and no API needs to be inserted into the web server 102. The web server 102 continues to operate normally, and the collector 106 (residing on a separate computing device) simply accesses data from the log file 104.

Figure 2:
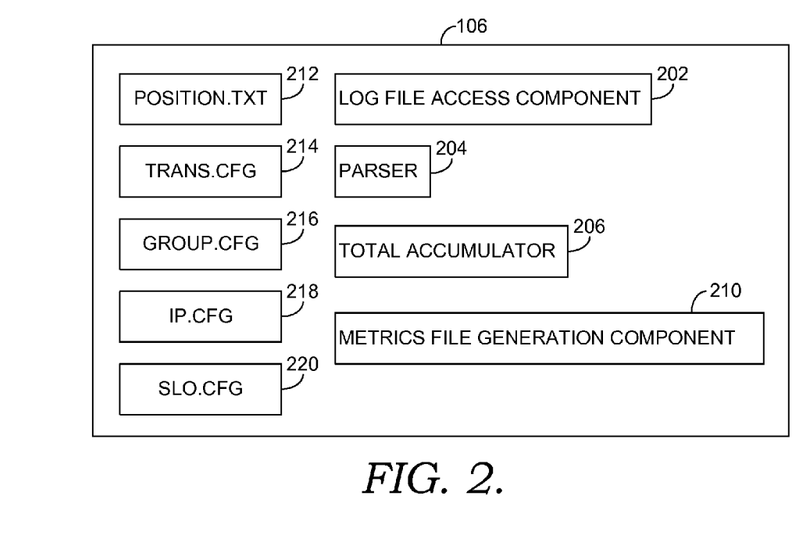
FIG. 2 is a block diagram of an exemplary collector in accordance with an embodiment of the present invention.

A block diagram of a collector 106 in accordance with one embodiment of the present is provided in FIG. 2. The collector 106 generally includes, among other components not shown, a log file access component 202, a parser 204, a total accumulator 206, and a metrics file generation component 210. Additionally, the collector 106 includes and/or has access to a number of configuration files, including position.txt 212, trans.cfg 214, group.cfg 216, ip.cfg 218, and slo.cfg 220, that facilitate operation of the collector 106 and generation of the metrics file 108.

The log file access component 202 accesses the log file 104 and retrieves information for the metrics file 108. In an embodiment, the log file access component 202 is configured to access the log file 104 at a given sampling rate, which may be configurable, and retrieve information from the log file 104 corresponding with an interval period defined by the sampling rate. For instance, the log file access component 202 may be configured to access the log file 104 every five minutes and retrieve information corresponding with the previous five minute period.

In an embodiment, the log file access component 202 employs a file named position.txt 212 for determining where the in log file 104 to begin retrieving information for a particular interval period. More particularly, when the log file access component 202 retrieves information from the log file 104, the number of bytes in the log file at that time is recorded in the position.txt file 212. Accordingly, the next time the log file access component 202 retrieves information from the log file, the log file access component 202 uses the total byte count from the position.txt file 212 to determine the position in the log file 104 at which to start retrieving information for the current time interval. In other words, the log file access component 202 retrieves all information in the log file 104 after the position indicated by the total byte count from the position.txt file 212. Each time the log file access component 202 retrieves information from the log file 104, the position.txt file 212 is updated to reflect the total byte count at that time for use during the next collection.

Typically, web server performance information is written to log files, such as the log file 104, in real-time, such that the information stored in the log files is organized based on time. The parser 204 is configured to parse information retrieved from the log file 104 to identify individual data entries. The parsed information is then used by the total accumulator 206 to generate information for the metrics file 108.

The total accumulator 206 aggregates web server performance information from the log file 104 on a per web page basis to generate web server metrics for the metrics file 108. Initially, the total accumulator 206 groups web server performance information by web page. This process includes identifying the web pages with which information from the log file 104 corresponds. In some cases, there may be dynamically generated web pages that create different link paths in the log file. However, the different link paths correspond with the same web page. For example, there may be a large number of portlets that all point to the same web page. However, based on the user request, portions of each portlet will be customized for each user. The dynamically generated output will then cause the link paths in the log file 104 to differ although the same web page was requested. Accordingly, to identify information from the log file 104 as corresponding with a given web page, the total accumulator 206 may perform pattern matching to identify information that corresponds with a particular web page. To facilitate this process, the total accumulator 206 may access the group.cfg file 216, which lists patterns and their corresponding web page. If a portion of a directory path in an entry in the log file 104 information matches a pattern from the list in the group.cfg file 216, the information is mapped to the corresponding web page for that pattern.

In some cases, there may be information in the log file 104 that should be excluded from the metrics file 108. For instance, there may be duplicate entries in the log file 104 for a given web server transaction. As a specific example, a load balancer may cause a duplicate entry to be logged. In particular, both a requesting client device's IP address and the load balancer's IP address may be counted and logged as separate web page requests when in reality, there has only been a single page request. Another example of information in the log file 104 that may be excluded is events from a web traffic simulator. In particular, if it is desirable for the metrics to reflect real transaction, simulated transaction from a web traffic simulator should be excluded. To facilitate data exclusion, an ip.cfg file 218 may be provided that lists IP addresses for which information should be excluded. Accordingly, the total accumulator 206 may access the ip.cfg file 218 and exclude entries corresponding with IP address listed in the ip.cfg file 218.

After grouping log file entries on a per page basis and excluding information based on the ip.cfg file 218 exclusions, the total accumulator 206 calculates several web server performance metrics. First, the total accumulator 206 determines the total number of page requests for each web page for the interval period. Next, the total accumulator 206 determines the total number of errors for each web page for the interval period. In some embodiments, the total accumulator 206 may determine total number of errors for each of a variety of different types of errors. For instance, in one embodiment, the total accumulator 206 determines a total error count, a faults error count, a time-outs error count, and a data problems error count.

The total accumulator 206 next identifies response times for the web pages and determines an average response time for each web page for the interval period. The total accumulator 206 also determines the total number of bytes transferred for each web page for the interval period. The total accumulator 206 further determines the number of web page requests for each web page for which a service level objective (SLO) was not met. In particular, the total accumulator 206 may access a slo.cfg file 220 that lists a SLO for each web page. In an embodiment, the SLO for a web page is a particular response time for that web page. The total accumulator 206 may compare the response time for each web page request for a given web page against the SLO for that web page from slo.cfg file 220. A SLO count is thus generated for a web page by determining the total number of times that the response time for the web page exceeds that web page's SLO during the time interval.

The metrics file generation component 210 generates and/or adds metrics information to the metrics file 108. An entry is provided for each web page with metrics information for that corresponding web page as determined by the total accumulator 206 (e.g., number of page requests, error counts, average response time, total bytes, and/or SLO count).

In an embodiment, a trans.cfg file 214 is provided that includes a list of all known web pages. By employing the list of web pages within the trans.cfg file 214, the metrics file generation component 210 may include an entry within the metrics file 108 for a web page even if the web page did not have any transactions during a time interval. In other words, the metrics file generation component 210 may provide an entry in the metrics file 108 for a given time interval for all web pages listed in the trans.cfg file 214 regardless of whether there were any transactions for some web pages. For web pages that did not have any transactions during the current time period, the metrics will reflect that no transactions occurred during that time period (e.g., zero web page requests, etc.).

Referring again to FIG. 1, after the collector 106 has generated web server performance metrics, the collector 106 generates a metrics file 108 using the web server performance metrics or adds the web server performance metrics to an existing metrics file 108. The metrics file 108 is the used to load data into the metrics database 110. In some embodiments the collector 106 may directly store the web server performance metrics to the metrics database 110.

Figure 3:
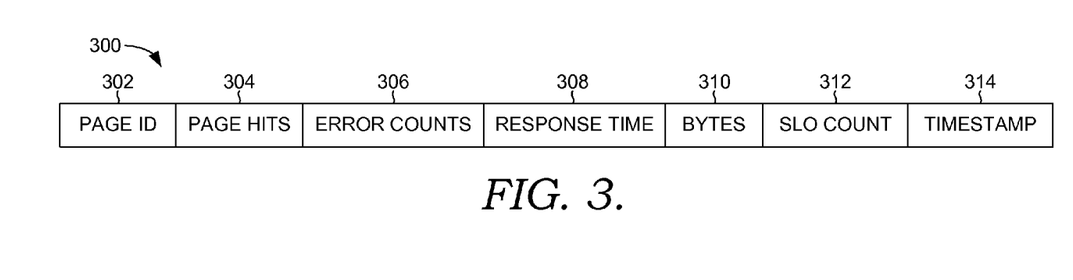
FIG. 3 is an exemplary data structure for a server performance metrics file in accordance with an embodiment of the present invention.

An exemplary data structure 300 for a metrics file in accordance with an embodiment of the present invention is illustrated in FIG. 3. The data structure 300 includes a first data field 302 containing data representing a web page identifier. As metrics are collected on a per page basis, the web page identifier provides an indication of which web page the following metrics correspond.

The data structure 300 also includes a second data field 304 containing data representing a total number of page hits during the time interval. In particular, this represents the total number of requests for the web page identified by the page identifier contained in the first data field 302

The data structure 300 further includes a third data field 306 containing data representing a error counts for the web page. As indicated previously, in various embodiments, one or more types of error counts may be tracked, including but not limited to a total number of errors during the time interval, a total number of faults during the time interval, a total number of time-outs during the time interval, and a total number of data problems during the time interval.

A fourth data field 308 contains data representing an average response time, indicating the average time it took the web server to respond to requests for the web page by providing the requested web page. A fifth data field 310 contains data representing a total number of bytes transferred for the web page during the time interval.

The data structure also includes a sixth data field 312 containing data representing a number of times during the time interval that a response time for the web page failed to meet the SLO set for that web page. The data structure further includes a seventh data field 314 containing data representing a timestamp for the present time interval. The timestamp may indicate, for instance, a start time or an end time for the present time interval.

Figure 4:
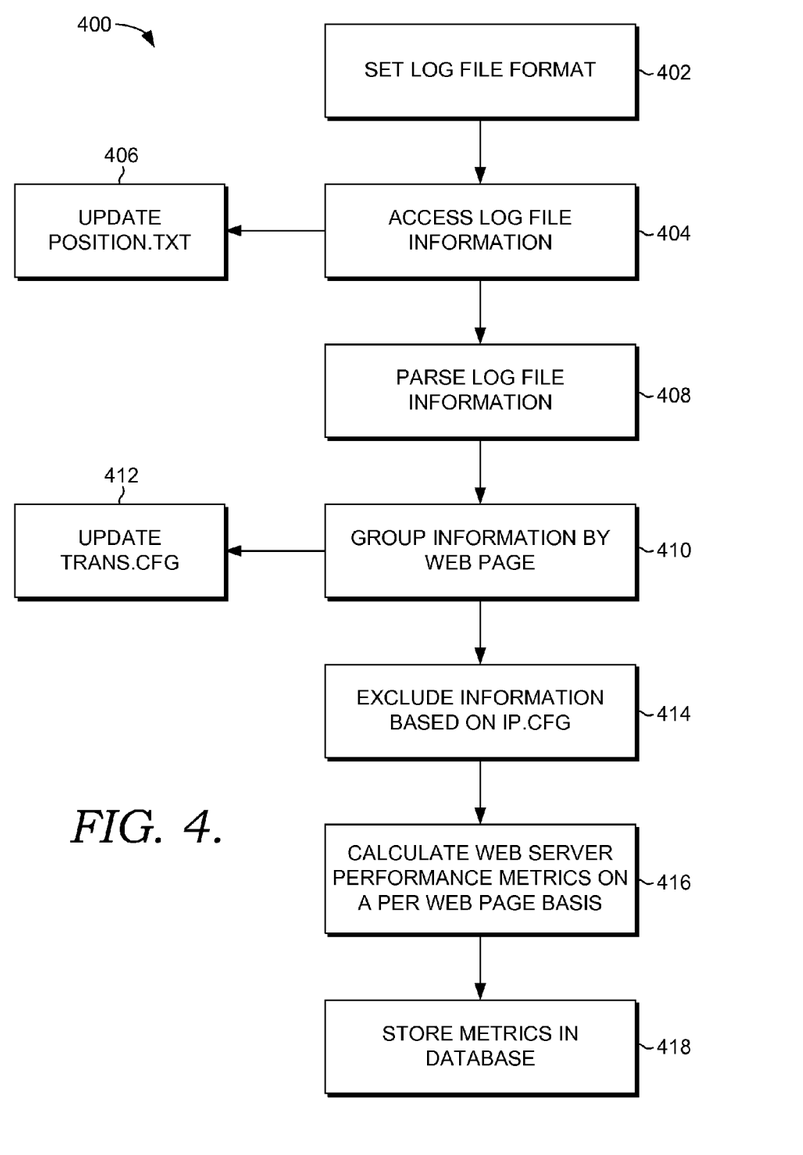
FIG. 4 is an flow diagram showing a method for generating web server performance metrics in accordance with an embodiment of the present invention.

Referring now to FIG. 4, a flow diagram is provided illustrating a method 400 for collecting web server performance metrics in accordance with an embodiment of the present invention. Initially, as shown at block 402, the log file format on a web server is set to a format that facilitates determining web server performance metrics. In particular, the log file format is set to one that is easily parseable and includes information necessary to generate a metrics file.

As shown at block 404, log file information from the log file on the web server is accessed by a collector, such as the collector 106 of FIG. 1. As indicated previously, in an embodiment, the collector resides on a computing device separate from the web server and may access the log file from the web server at some configurable time interval (e.g., every five minutes). When the collector accesses the log file, information from current time interval is retrieved (e.g., the last five minutes of information). In an embodiment, the total byte count of the log file at each log file access is recorded for determining where to begin retrieving information at the next log file access. Accordingly, when the log file is accessed, the current total byte count of the log file is recorded, as shown at block 406.

After accessing the log file, the log file information is parsed, as shown at block 408. Because metrics are provided on a per web page basis in embodiments of the present invention, the information is grouped by web page, as shown at block 410. In various embodiments, this may include identifying entries in the log file associated with different directories as corresponding with a common web page. For instance, a file including patterns that match given web pages, such as the group.cfg file 216 of FIG. 2, may be used to facilitate matching entries to a given web pages. In embodiments in which a trans.cfg file is used to maintain a list of web pages encountered by the collector, any new web pages that are identified are added to the trans.cfg file as shown at block 412.

As shown at block 414, entries associated with IP address that are listed in an exclusion file, such as the ip.cfg file 218 of FIG. 2, are excluded. The web server performance metrics are then calculated on a per web page basis, as shown at block 416, taking into account the grouping and exclusions of blocks 410 and 414. The web server performance metrics are then stored in a database external to the web server, as shown at block 418. As such, the web server performance metrics are available for offline reporting and analysis.

As can be seen, embodiments of the present invention are directed to accessing log file information from a log file on a web server and generating web server performance metrics on a per web page basis. The web server performance metrics are stored in a centralized database for offline reporting and analysis. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-storage media embodying computer-useable instructions for performing a method comprising:

accessing, on a computing device comprising a microprocessor and a memory, separate from a web server, log file information from a log file for the web server, the log file information including entries for web server transactions associated with a plurality of users of client devices during an interval period for each of a plurality of web pages maintained by the web server;

parsing the log file information;

grouping the parsed log file information by web page, wherein grouping comprises forming a group of the entries associated with the plurality of users of client devices and corresponding to a particular web page, wherein each entry in the group of entries corresponds to the particular web page, and wherein a first entry in the group of entries has a first directory path and a second entry in the group has a second directory path which is different from the first directory path, wherein the first directory path is associated with a first user and the second directory path is associated with a second user;

calculating web server performance metrics on a per web page basis for the interval period based on the parsed log file information, wherein the web server performance metrics include for at least a portion of the plurality of web pages: a number of web page requests, error counts, average response time over substantially all requests during the interval, total number of bytes, and a number of times a service level objective was not met; and storing the web server performance metrics, as separately calculated for each of the plurality of web pages, in a database.

2. The one or more computer-storage media of claim 1, wherein accessing the log file information from the log file comprises:

determining a total byte count for the log file recorded from a previous log file access;

determining a location in the log file corresponding with the total byte count; and retrieving the log file information from the log file following the location in the log file corresponding with the total byte count.

3. The one or more computer-storage media of claim 1, wherein the method further comprises recording a total byte count for the log file.

4. The one or more computer-storage media of claim 1, wherein forming the group of the entries associated with a particular web page comprises identifying a pattern within the a directory path associated with an entry from the plurality of entries and determining that the pattern corresponds with the particular web page.

5. The one or more computer-storage media of claim 4, wherein forming the group is performed using a file mapping a plurality of directory path patterns with corresponding web pages.

6. The one or more computer-storage media of claim 1, wherein the method includes determining that one or more of the entries are excludable entries based on one or more IP addresses associated with the one or more excludable entries, and excluding the one or more excludable entries when calculating the web page performance metrics.

7. The one or more computer-storage media of claim 6, wherein the one or more IP addresses are listed in a configuration file providing a list of a plurality of IP addresses for exclusion.

8. The one or more computer-storage media of claim 1, wherein a number of times a service level objective was not met for a particular web page is determined by:

(1) accessing a file containing service level objectives for at least a portion of the plurality of web pages to determine the service level objective for the particular web page, wherein the service level objective is a predetermined response time for the particular web page; and (2) comparing response times in the log file information for the particular web page against the predetermined response time to determine the number of response times that exceed the predetermined response time.

9. The one or more computer-storage media of claim 1, wherein the method further includes providing a timestamp associated with the interval period with the web server performance metrics.

10. One or more non-transitory computer-storage media embodying computer-useable components which, when executed by one or more computing devices comprising a microprocessor and a memory, generate web server performance metrics for facilitating web server performance analysis, the computer-useable components including:

a log file access component that accesses log file information from a log file for a web server at a predetermined sampling rate, the log file including a plurality of entries for web server transactions for a plurality of web pages maintained by the web server, the web server transactions including, for each web page, web page requests and responses associated with a plurality of users of client devices;

a parser that parses the log file information;

a total accumulator for calculating the web server performance metrics on a per web page basis based on the parsed log file information, wherein the total accumulator forms a group of entries associated with users in the plurality of users of client devices and corresponding to a particular web page, wherein each entry in the group of entries corresponds to the particular web page, by identifying a pattern within a directory path associated with the entry and determining that the pattern corresponds with the particular web page, wherein the total accumulator calculates the web server performance metrics for interval periods corresponding with the predetermined sampling rate, and wherein the web server performance metrics include, for each web page, a total number of web page requests for the web page, an error count for the web page, an average response time over substantially all requests during the interval period for the web page, a total number bytes transferred for the web page, and a number of times a service level objective was exceeded for the web page;

wherein the web server performance metrics from the total accumulator are stored in a database external to the web server separately for each of the plurality of web pages.

11. The one or more computer-storage media of claim 10, wherein when the log file access component access log file information from the log file, the log file access component accesses a file indicating a total number of bytes for the log file from a previous log file access to determine a starting point within the log file for retrieving the log file information.

12. The one or more computer-storage media of claim 10, wherein the total accumulator accesses a file mapping a plurality of directory path patterns with corresponding web pages.

13. The one or more computer-storage media of claim 10, wherein the total accumulator determines that one or more of the plurality of entries are excludable entries based on one or more IP addresses associated with the one or more excludable entries, and excludes the one or more excludable entries when calculating the web page performance metrics.

14. The one or more computer-storage media of claim 13, wherein the total accumulator exclude the one or more entries based on a configuration file providing a list of a plurality of IP addresses for exclusion.

15. The one or more computer-storage media of claim 10, wherein the total accumulator determines the number of times a service level objective was exceeded for each web page by:
   (1) accessing a file containing service level objectives for at least a portion of the plurality of web pages to determine the service level objective for each web page, wherein the service level objective is a predetermined response time for each web page; and
   (2) comparing response times in the log file information for each web page against the predetermined response time to determine the number of response times that exceed the predetermined response time for each web page.

16. The one or more computer-storage media of claim 10, wherein the web server performance metrics includes a corresponding timestamp associated with the interval period with the web server performance metrics.

17. A collector, comprising one or more computing devices including a microprocessor and a memory embodying computer-useable instructions for performing a method of storing web server performance metrics, the method comprising:
   calculating web server performance metrics on a per web page basis based on a grouping of web server transactions associated with a plurality of users of client devices for each web page, wherein for a given web page the grouping includes a group of entries comprising web page requests from the plurality of users of client devices and corresponding to the given web page;
   storing the web server performance metrics in a data structure maintained in a database, wherein the data structure includes:
   a first data field containing data representing a web page identifier for a web page;
   a second data field containing data representing a total number requests from the plurality of users of client devices for the web page during an interval period;
   a third data field containing data representing an error count for the web page during the interval period;
   a fourth data field containing data representing an average response time for the web page during the interval period;
   a fifth data field containing data representing a total number of bytes transferred for the web page during the interval period; and
   a sixth data field containing data representing a number of times a service level objective for the web page was exceeded during the time interval.

18. The collector of claim 17, wherein the data structure further includes a seventh data field containing data representing a timestamp associated with the time interval.

* * * * *